UNITED STATES PATENT OFFICE.

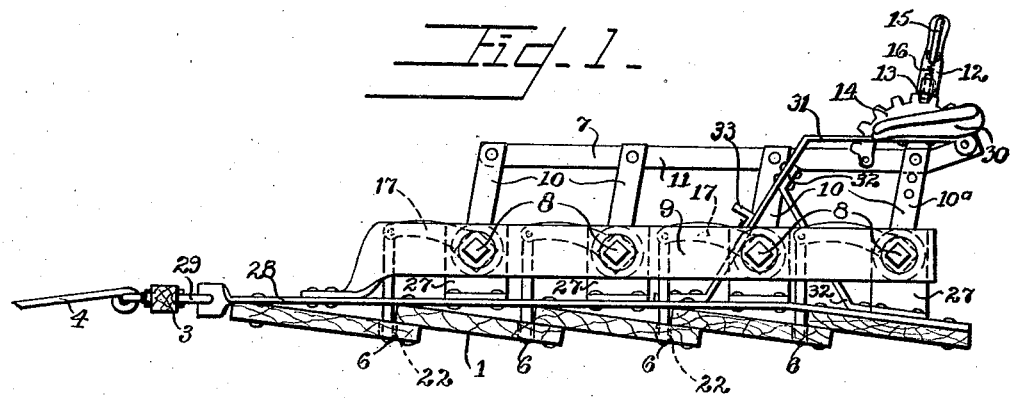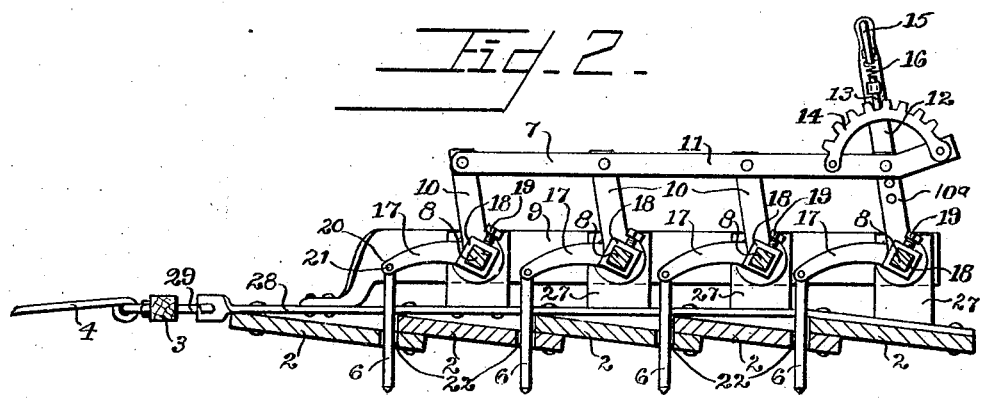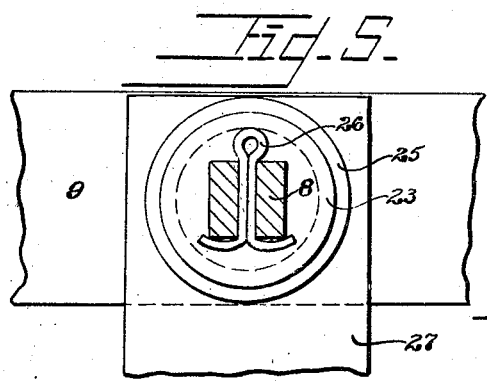

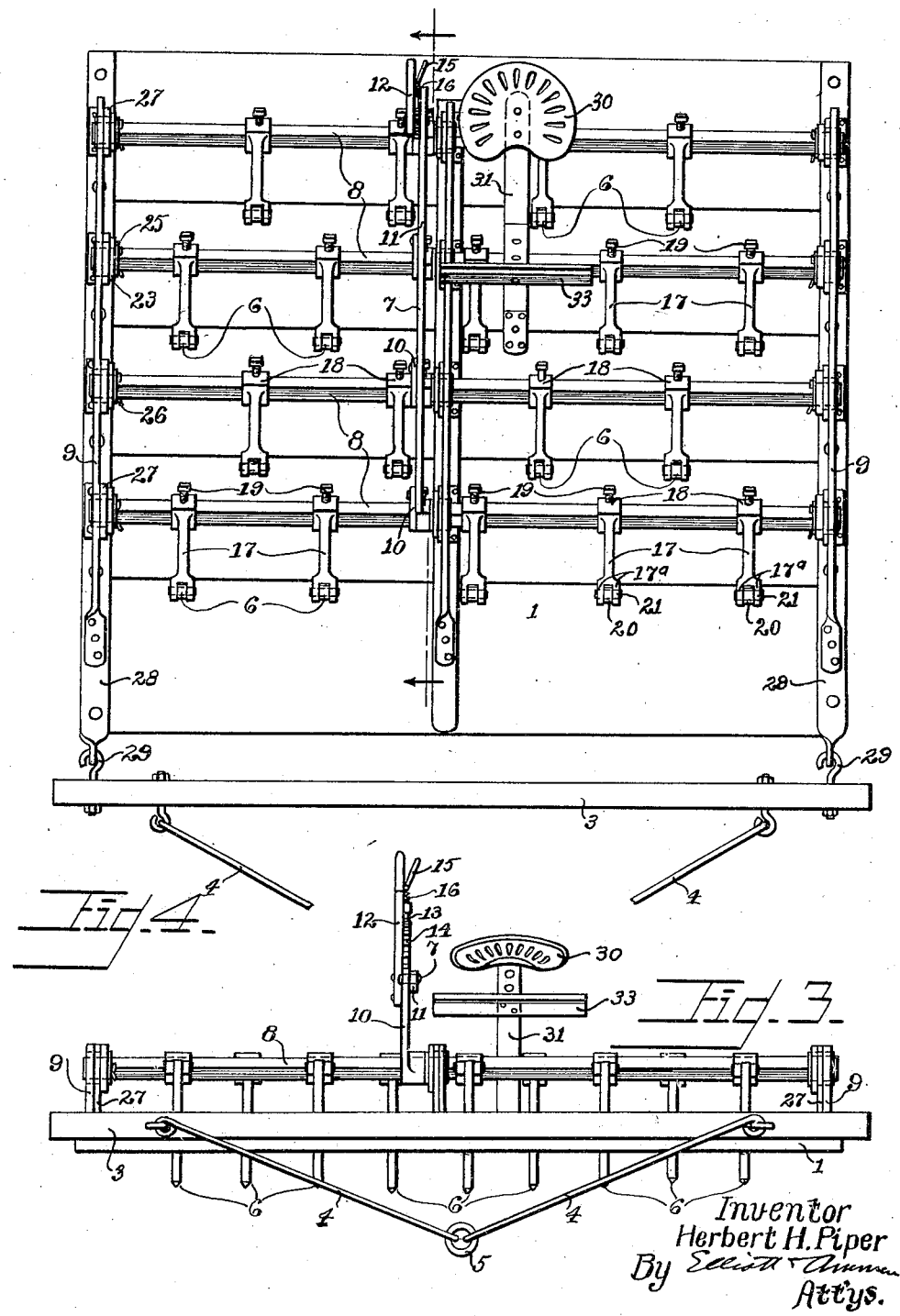

HERBERT H. PIPER, OF JACKSON, MISSOURI, ASSIGNOR OF ONE-HALF TO ELIZA C. PIPER, OF JACKSON, MISSOURI, AND ONE-HALF TO JOHN A. WITHERS, OF CAPE GIRARDEAU, MISSOURI.

CULTIVATOR.

1,418,164.   Specification of Letters Patent.   Patented May 30, 1922.

Application filed August 2, 1920. Serial No. 400,591.

*To all whom it may concern:*

Be it known that I, HERBERT H. PIPER, a citizen of the United States, residing in the town of Jackson, county of Cape Girardeau, and State of Missouri, have invented new and useful Improvements in Cultivators, of which the following is a specification.

This invention relates to an agricultural implement, the purpose of which is to cultivate or improve the condition of the ground. After the ground has been plowed and harrowed, its surface is usually covered with clods; in order to put such ground in condition for sowing seed, these clods must be broken up or pulverized; therefore this implement may be considered a ground pulverizer or conditioner, the function of which is to break up and pulverize the clods referred to. The general object of the invention is to produce an implement for this purpose having improved means for engaging and breaking up the clods. In its general construction, the implement includes a platform or deck which is adapted to be drawn along the surface of the ground by a horse or horses, and through this deck a plurality of teeth are guided. One of the objects of the invention is to provide improved means for operating these teeth at will so as to regulate the amount that they project below the deck, and to clear them of weeds.

Further objects of the invention will appear hereinafter.

The invention consists in the novel features, and in the general combination of parts to be particularly described hereinafter, all of which contribute to produce a simple and efficient ground conditioner or pulverizer. A preferred embodiment of my invention will be particularly described in the following specification, while the broad scope of my invention will be pointed out in the appended claims.

In the drawing,

Figure 1 is a side elevation of the implement embodying my invention;

Figure 2 is a longitudinal vertical section;

Figure 3 is a front elevation of the machine;

Figure 4 is a plan partially broken away;

Figure 5 is a vertical cross section through one of the swivel bars just beyond its supporting side bar; and Figure 6 is a vertical section, at substantially the same point.

In carrying out my invention, I provide a clod-breaker which is preferably in the form of a platform or deck 1, constructed with a plurality of metal bars or flat boards 2 which are arranged so that each rearwardly disposed board has its forward edge overlapping the next adjacent board forward thereof. The forward end of this deck is provided with a transverse draw-bar or single-tree 3 to which inclined links 4 are attached, which are connected by a ring 5 to which a double-tree or single-tree may be attached to enable the implement to be drawn by a horse or horses. The natural tendency of this deck is to break up the clods of earth, but sometimes the clods are of such form that they will not become broken and merely sink into the soft earth. I provide teeth for penetrating the earth to prevent such an action and to insure that all of the clods will be effectively broken up; these teeth are indicated by the numeral 6 and are preferably disposed in transverse rows or sets (see Fig. 4). These teeth are carried by a movable frame 7 which preferably comprises a plurality of transverse swivel bars 8, the ends of which are rotatably supported in fixed side bars 9 secured near the edges of the implement. The teeth of each transverse row or set are attached by suitable means to the swivel bars 8. The swivel bars are connected by suitable means which will enable them to be rotated in unison. For this purpose, each bar 8 is provided with an operating arm 10 near the middle line of the machine, and these arms are all connected by a pivotally attached link 11. These parts form a flexible frame. I provide means independent of the deck and carried solely by the flexible frame which will enable the flexible frame to be locked in a plurality of different positions and thereby regulate or control the position of the teeth. They have square sleeves received over the swivel bars. The rearmost arm indicated by the reference numeral $10^a$, is provided with an upward extension 12 which extends well above the link 11, and constitutes a controlling lever for swinging the movable frame 7. The controlling lever 12 is provided with locking means including a bolt 13 which co-operates with a toothed quadrant 14 which is fixed to the link 11 (see Fig. 5). The bolt 13 may be released by a finger lever 15 and is normally held in engagement with the quadrant by a spring 16.

In order to form a connection between the swivel bars 8 and the teeth 6, I prefer to provide a malleable iron arm 17 in the form of a slight bow. The inner end of this arm is in the form of a square sleeve 18 which may be slid over the bar and secured in any adjusted position desired by means of a set screw 19. The bars 8 are square and the collars fit neatly on them. These set screws enable the arms 17 to be attached so that the teeth will aline with the guide holes in the deck, which will be described later.

The upper ends of the teeth 6 are formed with heads 20 (see Fig. 4) which are connected by joints to the arms, that is they are attached by pivot bolts 21 to the forks 17ª formed on the forward ends of the arms 17.

The teeth 6 are preferably disposed in a vertical position. In order to guide them I prefer to provide the deck, just forward of the overlapping portions, with vertical guide openings 22. These guide openings are only slightly larger than the teeth and are preferably of square form to fit the cross section of the teeth.

It will be evident that if the controlling lever 12 is released from the quadrant and swung forwardly, the teeth 6 will move downwardly through the guide openings 22 so that they may project a considerable distance into the ground below the deck 1. The amount of this projection can evidently be regulated as desired. When the controlling lever 12 is swung in the opposite direction, the teeth will all be withdrawn in an upward direction in the openings 22, and this will have the effect of clearing or wiping débris, such as weeds, from the teeth.

In order to make the swivel connection between the swivel bars 8 and the fixed side bars 9, I prefer to provide a collar 23 at each end of the bar which is provided with an opening 24 of square form, enabling it to slip over the end of the bar. This collar 23 carries a bushing 25 which is secured in an opening in the side bar (see Fig. 6). The collar 23 is held in place by a split pin 26.

The fixed side bars 9 may be supported on fixed standards 27, the lower ends of which are bolted to base bars 28 which extend along the side edges of the deck, and are bolted to the boards 2 at their overlapping points. The cross bar 3 may be attached to the forward ends of these base bars 28 by suitable hooks 29. These base bars 28 may be formed of strap iron or steel.

The implement is provided with a seat 30 for the driver, supported on a rearwardly inclined post 31. The post has a brace 32 attached at an intermediate point so that the seat 30 is supported on an overhanging end that gives a spring effect and relieves the driver of jolts. The seat post is also provided with a foot rest 33.

It will be seen that my invention avoids the necessity of employing a fixed quadrant secured to the deck. This is highly advantageous because such a fixed quadrant is subjected to very severe strains and must be very securely fastened. A flexible frame composed of the arms 10 and the links 7 and 9 carries and supports independently of the deck, the locking means which enables the flexible frame to be held in different positions.

It is understood that the embodiment of the invention described herein is only one of the many embodiments my invention may take, and I do not wish to be limited in the practice of my invention nor in my claims, to the particular embodiment set forth.

What I claim is:

1. In a cultivator, the combination of a deck having means for drawing the same along the ground, and having a plurality of openings therethrough, a flexible frame having a plurality of swivel bars rotatably supported above the deck and including means for connecting the swivel bars to rotate the same in unison on their axes, a plurality of arms carried by the swivel bars and extending substantially horizontally therefrom, a plurality of teeth having joints connecting the same to the arms at points substantially in vertical alignment with the openings respectively and extending downwardly in a substantially vertical direction through the openings, means for rotating the swivel bars in unison to raise or lower the teeth with respect to the deck, and means carried solely by the flexible frame and independent of the deck for locking the flexible frame in a plurality of different positions.

2. In a cultivator, the combination of a deck having means for drawing the same along the ground, a plurality of swivel bars mounted to rotate on their axis above the said deck, an operating arm rigid with each swivel bar, a link connecting said arms for rotating the swivel bars in unison, a plurality of teeth actuated by said swivel bars and extending downwardly through said openings respectively, and means independent of the deck and carried by one of the said operating arms and the link for locking the link rigidly to one of the arms in a plurality of different positions.

3. In a cultivator, the combination of a deck having means for drawing the same along the ground, and having a plurality of guide-openings therethrough, a plurality of teeth disposed in sets and mounted to slide through said openings, a plurality of swivel bars mounted to rotate on their axes above said deck, means connecting the sets of teeth with the swivel bars respectively, an operating arm corresponding to each swivel bar, a link connecting said operating arms for rotating the swivel bars in unison, a quadrant independent of the deck and carried by said link adjacent to one of the operating arms and locking means carried by that operating arm adjacent to the quadrant and co-operating with the quadrant for locking the operating arms in a plurality of different positions.

4. In a cultivator, the combination of a deck having means for drawing the same along the ground, said deck having a plurality of guide-openings therethrough, a plurality of swivel bars supported above said deck to rotate on a longitudinal axis, a plurality of teeth guided respectively through said openings, a plurality of substantially horizontal arms corresponding to said teeth and rigidly attached to said swivel bars, a pivot connection connecting each tooth with its corresponding horizontal arm, the axis of each of said pivot connections lying substantially vertically over the corresponding opening for that tooth, an operating arm carried by each of said swivel bars, a link pivotally connected with all of the operating arms to enable the same to be moved in unison, and hand-operated means independent of the deck and supported solely by the operating arms and link for rigidly securing one of the operating arms to the link to hold all of the teeth in unison in a fixed position.

5. In a cultivator, the combination of a deck having means for drawing the same along the ground and having a plurality of guide-openings therethrough, a plurality of teeth mounted to slide through said openings, a plurality of swivel bars mounted to rotate on their axes above the said deck, an operating arm carried by each swivel bar, a link pivotally connected with said operating arms to move the same in unison, a connection connecting each tooth with its corresponding swivel bar to enable the swivel bars to control the position of the teeth, one of said operating arms having an extension constituting a controlling lever, a quadrant independent of the deck, and carried by said link adjacent to the controlling lever and locking means carried by the controlling lever to co-operate with the quadrant to lock the swivel bars in a plurality of different positions.

6. In a cultivator, the combination of a deck having means for drawing the same along the ground, said deck consisting of a plurality of boards disposed transversely to the direction of advance of the pulverizer, each rearwardly disposed board having its forward edge overlapping the next adjacent board forward thereof, said boards forward of the overlapping portions having a plurality of guide-openings therethrough, a plurality of teeth corresponding to said guide-openings and mounted to slide therethrough, a flexible frame having arms connected with the teeth, and means independent of the deck and carried by the flexible frame for locking the same in a plurality of different positions.

7. In a cultivator, the combination of a deck having means for drawing the same along the ground and having a plurality of guide-openings therethrough, a plurality of teeth mounted to slide through said openings, a plurality of swivel bars mounted to rotate on their axes above the said deck, an operating arm carried by each swivel bar, a link pivotally connected with the said operating arms to move the same in unison, a substantially horizontal arm carried by each swivel bar corresponding to each tooth and connected with its corresponding tooth at a point in a substantially vertical line over the opening through which that tooth projects, means for moving the swivel bars in unison to raise or lower the teeth through their openings, said horizontal arms operating to maintain the teeth in a substantially vertical position.

In testimony whereof, I have hereunto set my hand.

HERBERT H. PIPER.